United States Patent [19]
de Groot et al.

[11] Patent Number: 5,371,587
[45] Date of Patent: Dec. 6, 1994

[54] CHIRPED SYNTHETIC WAVELENGTH LASER RADAR

[75] Inventors: Peter J. de Groot; John A. McGarvey, both of Bellevue, Wash.

[73] Assignee: The Boeing Company, Seattle, Wash.

[21] Appl. No.: 879,836

[22] Filed: May 6, 1992

[51] Int. Cl.$^5$ .......................... G01B 9/02; G01B 11/02
[52] U.S. Cl. .................................... 356/349; 356/357; 356/358
[58] Field of Search .............. 356/345, 349, 357, 358, 356/359, 360

[56] References Cited

U.S. PATENT DOCUMENTS

| | | | |
|---|---|---|---|
| 4,492,464 | 1/1985 | Bourdet et al. | 356/4.5 |
| 4,552,457 | 11/1985 | Giallorenzi et al. | 356/345 |
| 4,611,915 | 9/1986 | Gillard et al. | 356/349 |
| 4,830,486 | 5/1989 | Goodwin | 356/349 X |
| 4,874,244 | 10/1989 | Kersey | 356/350 |
| 4,886,363 | 12/1989 | Jungquist | 356/349 |
| 4,907,886 | 3/1990 | Dandliker | 356/349 |
| 5,054,912 | 10/1991 | Kuchel | 356/349 |
| 5,106,191 | 4/1992 | Ohtsuka | 356/349 |
| 5,106,192 | 4/1992 | Tucker et al. | 356/349 |
| 5,141,319 | 8/1992 | Kajimura et al. | 356/358 |
| 5,153,669 | 10/1992 | DeGroot | 356/349 |

OTHER PUBLICATIONS

Wesolowicz et al., "Laser Radar Range Imaging Sensor for Commercial Applications", SPIE vol. 783 Laser Radar II (1987).
Greve et al., "Laser-diode distance meter in a KERN DKM 3A theodolite," Applied Optics, vol. 23, No. 17, Sep. 1, 1984.
Abbas et al., "High-precision fiber-optic position sensing using diode laser radar techniques," SPIE vol. 1219, Laser-Diode Technology and Applications II (1990).
Slotwinski et al., "Utilizing GaAlAs Laser Diodes as a Source for Frequency Modulated Continuous Wave (FMCW) Coherent Laser Radars," SPIE vol. 1043 Laser Diode Technology and Applications (1989).
Massie et al., "Absolute Distance Interferometry," SPIE vol. 816 Interferometric Metrology (1987).
Williams et al., "Absolute optical ranging with 200-nm resolution," Optical Letters, vol. 14, No. 11, Jun. 1, 1989.
Boef, "Two-wavelength scanning spot interferometer using single-frequency diode lasers," Applied Optics, vol. 27, No. 2, Jan. 15, 1988.
deGroot, "Laser diode technologies for in-process metrology," SPIE 1333, Paper 21 (1990).
Berkoff et al., "Interferometric Displacement Sensing by Visibility Modulation," Optical Fiber Sensors, 1989.

Primary Examiner—Robert J. Warden
Assistant Examiner—Robert Carpenter
Attorney, Agent, or Firm—Foley & Lardner

[57] ABSTRACT

An interferometer with a dual laser source having a tunable frequency separation between the laser emissions is used to measure absolute distance to weakly-reflecting targets. A dual-laser source is commonly characterized by a synthetic wavelength, which is equal to the speed of light divided by the frequency separation with time over a total frequency range that is small compared to the average frequency separation. Simultaneously, a high-speed phase modulator generates a signal whose amplitude is proportional to the interferometric fringe visibility, and data acquisition means are used to record the fringe visibility as a function of time during the synthetic wavelength chirp. Signal processing means are then used to extract the frequency and phase of the resultant quasi-periodic fringe-visibility curve. The optical path is then determined to high accuracy without the phase ambiguity problems of prior-art synthetic-wavelength techniques. An optical fiber implementation of a preferred embodiment of the invention operates over a 0.1 to 10 inch range, using a 0.01-inch diameter 100 $\mu$W laser beam, with an absolute error of less than 0.001 inch (25 $\mu$m). The invention can be used for dimensional gauging, surface profiling and position measurement, and will improve productivity and quality control in manufacturing.

12 Claims, 6 Drawing Sheets

CHIRPED SYNTHETIC WAVELENGTH LASER RADAR

FIELD OF INVENTION

This invention relates generally to gauges and sensors for measuring physical distances, and particularly to optical sensors for measurement of distances from 0.1 to 10 inches for manufacturing applications.

BACKGROUND

In the manufacturing environment, the traditional method of measuring dimensions is with mechanical gauges. Linear distances are measured with rulers, calipers, metal tape or precision mechanical stages. These methods involve mechanical contact with the surfaces, and can be very slow because of the manual adjustments required. Further, many types of objects such as rotating shafts, spindles and wheels cannot be conveniently measured mechanically while they are in motion.

Electronic alternatives to mechanical gauges are usually based on capacitance or eddy currents. These devices have the advantage of a direct measurement of a dimension without manual comparison with a standard. This direct measurement capability increases the speed of measurement and reduces errors due to distortion when a reference piece is contacted with the test piece. However, electronic gauges can be material dependent, and usually do not work at all with non-metallic materials such as fiberglass, plastics and some kinds of composite materials. Also, their operational range may be very limited.

Because of the recognized limitations of mechanical gauges, alternative optical methods involving time-off-flight laser radar are of interest. The following articles discuss various examples of related prior art in laser techniques for distance measurement.

In an article entitled "Laser Radar Range Imaging Sensor For Commercial Applications" by K. G. Wesolowicz and Robert E. Sampson, SPIE Proc. Vol. 783, p. 152 (1987), there is described an imaging laser radar system employing a single frequency (0.72 GHz) intensity modulation of a GaAlAs laser diode operating at 0.82 $\mu$m. The target range x is obtained from the phase delay of the modulation. Since the phase has an implicit $2\pi$ ambiguity, the range measurement has a corresponding ambiguity interval. For a modulation frequency v of 0.72 GHz, this interval is 8.2 inches. The article claims a resolution for this radar of between 0.032 and 0.004 inches at 3 feet, depending on the type of target, the measurement time, and the application. It is not clear that the absolute accuracy of the instrument is also 0.004 inch, since this would appear to require 40 ppm linearity in the phase measurement.

In an article entitled "Laser-diode Distance Meter in a KERN DKM 3A Theodolite" by A. Greve and W. Harth, Applied Optics, Vol. 23, No. 17, p. 2982 (1984), there is described an intensity-modulated laser radar that uses a phase locking technique to measure the relative phase $\phi$. The modulation frequency is in the 1.745–1.8 GHz range. The ambiguity in the range measurement, at least in principle, can be removed by varying the modulation frequency. In Table II of the article, a distance measurement variation of 85 $\mu$m at 2.9 m is claimed. FIG. 3 of the article shows large distortions in the measurement curves that imply a much lower absolute accuracy.

In an article entitled "High-Precision Fiber-Optic Position Sensing Using Diode Laser Radar Techniques" by G. Abbas, W. R. Babbitt, M. de la Chapelle, M. Fleshner, J. D. McClure, and E. Vertatschitsch, there is described a linear position sensor with fiber-optic signal distribution. The sensor uses a frequency-chirped, intensity-modulated laser diode. The intensity-modulation bandwidth is 6 GHz. Absolute distance is obtained by determining the beat frequency between the laser modulation and the delayed modulation of the return signal. The beat frequency is found by high-speed digital Fourier transforming of the beat signal. This approach has the important advantage that several sensor heads may be connected by fiber optics to the same source and detection module, provided that the possible variations in range to each of the heads do not overlap. The experimental system described in the article achieves 58 $\mu$m RMS range error over 100 cm using a 1 ms chirp duration and a signal processing time of 50 $\mu$sec. A resolution of 10 $\mu$m is projected for an improved version of this system. Although the achievements and specifications of this instrument are consistent with some of the objectives of the present invention, the system uses a highly cooperative target (a retroreflector) and expensive radio-frequency hardware. Modification of this system for non-cooperative surfaces in manufacturing may not be practical or cost effective.

In an article entitled "Utilizing GaAlAs Laser Diodes as a Source (sic) for Frequency Modulated Continuous Wave (FMCW) Coherent Laser Radars" by A. Slotwinski, F. Goodwin and D. Simonson, SPIE Vol. 1043, p. 245 (1989), there is described an instrument that uses optical interferometry to generate beat signals between local and time-delayed optical frequencies. The frequency modulation is achieved by thermal tuning of a laser diode cavity length. The thermal tuning is easily effected by precisely controlled variation of the laser excitation current and is thus much easier to obtain over large bandwidths ($>5$ GHz) than an intensity-modulation chirp. The article claims a resolution of 1 mil (25 $\mu$m) by using a reference length for continuous calibration. However, high accuracy and reliability can only be obtained with carefully characterized and monitored single-mode laser diodes. The commercial system is also very expensive and may be sensitive to vibration.

Laser interferometers are widely employed for high-precision displacement measurement and very-high resolution surface profilometry. An example of a commercial instrument in use is the well-known Hewlett Packard Laser Gauge. However, a problem with these instruments relates to the interference phase ambiguity. Interferometry with a single, constant wavelength cannot be used to measure a distance without ambiguity of one-half of one wavelength. Thus, the beam cannot be broken and only highly-reflective, "cooperative" targets such as mirrors and retroreflectors can be used. This seriously limits the applicability of interferometry for measurement tasks in manufacturing.

One known method to extend the range of metrology applications for interferometry is to measure the interferometric phase at two or more distinct wavelengths. This is the method that most closely relates to the present invention. The difference between the interferometric phase measurements at two vacuum wavelengths $\lambda_1$ and $\lambda_2$ corresponds to a synthetic wavelength $\Lambda$ given by $$1/\Lambda = 1/\lambda_1 - 1/\lambda_2 \tag{1}$$

If the measured interferometric phase is $\phi_1$ and $\phi_2$ for the two wavelengths, then the distance x can be measured to within an interval $\Lambda$ by using $$x = \Lambda(\phi_1 - \phi_2)/4\pi \tag{2}$$

In that the synthetic wavelength may be large compared to visible-light wavelengths, it is possible to measure larger distances before phase ambiguities contribute to measurement errors. If several synthetic wavelengths of different size are used, it is possible to make measurements of successively higher precision to "ladder down" to high accuracy without the inconvenience of phase ambiguities. One of the advantages of this approach over the intensity-modulation techniques described above is that the synthetic wavelength can be made very much smaller and the precision proportionally better than is practical with direct-detection techniques.

An article entitled "Absolute distance interferometry, "by N. A. Massie and H. John Caulfield, SPIE Proceedings, Vol. 816, pp. 149–157 (1987) summarizes the prior art for this type of multiple-wavelength laser ranging technology. The basic principles are described, and several implementations described in other journal articles are presented. Most of these examples involve complex and expensive gas or tunable dye lasers for generating multiple wavelengths. In most cases, no more than two wavelengths are obtainable at any one time from the source, thus increasing the complexity by requiring time-multiplexing and automated laser tuning.

In an article entitled "Absolute optical ranging with 200-nm resolution" by C. Williams and H. Wickramasinge, Optics Letters, Vol. 14, pp. 542–544 (1989), there is described a two-wavelength interferometer requiring the use of two independently-controlled and aligned GaAlAs single-mode laser diodes. This system has the advantage that it uses relatively inexpensive and compact laser diodes. However, the data shows a very small demonstrated operational range (less than 1 mm) and a complex and expensive system of acousto-optic modulators for time-multiplexing the signals for the two wavelengths was used. Changing the synthetic wavelength required modifying the operating conditions (changing the temperature and excitation levels) of the lasers.

In an article entitled "Two-wavelength scanning spot interferometer using single-frequency diode laser" by A. J. den Boef, Appl. Opt., Vol. 27, pp. 306–311 (1988), there is described the use of two single-frequency laser diodes operating simultaneously, with the wavelength separation achieved by polarization. Only one synthetic wavelength is available at a given time.

In an article entitled "Laser diode technologies for in-process metrology," by P. de Groot, SPIE Proc., Vol. 1333, Paper 21 (San Diego, July, 1990), there is described a two-wavelength interferometer using a single, multiple-wavelength laser diode. The laser used was a conventional two-wall Fabry-Perot device exhibiting multiple longitudinal oscillation modes over a spectral width of about 1.2 nm. The interferometric phase for each of the wavelengths was detected with a wavelength-selective detection system involving a diffraction grating. Only one synthetic wavelength (700 $\mu$m) was used because of the limited spectral width of the source. Further, the multimode diode had poor temporal coherence and could not be used for interferometry for optical path lengths exceeding 1 mm.

In an article entitled, "Interferometric displacement sensing by visibility modulation," by T. A. Berkoff and A. D. Kersey, OFS '89, 78–82 (Springer Verlag, 1989), there is described a fiber interferometer in which an integrated-optic intensity modulator is used to generate a carrier-suppressed, synthesized two-wavelength source with frequency separation between 10 and 100 MHz. Two kinds of measurements are described. One is the determination of distance by measuring the frequencies for which the fringe visibility is nulled. The other is displacement sensing by locking onto one of these fringe-visibility minima. Since the distance measurement method described in this article requires a variation frequency separation (90 MHz) that is comparable to the largest attainable separation (100 MHz), there is little advantage of this approach over the FMCW method described by Slotwinski et al. cited herein. Also, because the 100 MHz frequency separation of the synthesized modes is relatively small, the resulting resolution is only ±2 mm.

The above cited prior art does not adequately meet the simultaneous requirements of accuracy, operational range, cost and low power for the measurement applications of interest to this disclosure.

SUMMARY OF THE INVENTION

The foregoing and other problems are overcome by method and apparatus for optical measurement of distance using optical interferometry with a continuously tuned two-wavelength laser source. The detection method is based on analysis of a fringe-contrast curve, but does not require that the frequency separation to be variable over a range comparable to the largest possible separation. Since it is generally much easier technically to have two simultaneous emissions that are widely separated in optical frequency than it is to vary an emission frequency continuously over a wide range, the invention does not require any costly advance in optical component technology in order to achieve very high absolute accuracy, even with very weakly reflecting targets.

The technique employed by the instant invention will be referred to as Chirped Synthetic Wavelength (CSW) laser radar. An embodiment of the present invention consists of a coherent optical source comprised of two single-frequency lasers with a tunable frequency separation, a compact probe or sensor head, a compensating reference interferometer for continuously measuring the relative frequency of the two lasers, and detection and signal processing means for extracting distance information.

In accordance with a method of the present invention, and an apparatus for accomplishing same, a first step transmits the combined emissions from the two lasers to the probe through an optical fiber, which serves to direct the light onto a target. A second step mixes the reflected light from the surfaces of the target and the reflections from the fiber endface and returns the light through the fiber back to the source. The relative phase of the resultant interference pattern is modulated by opto-mechanical means incorporated into the probe, resulting in a periodic signal. A further step rectifies and filters the interference signal, resulting in a voltage proportional to the contrast of the interference fringes that produce the interference signal. During data acquisition, the frequency separation of the lasers is linearly varied or "chirped," resulting in a variation in the fringe contrast. In a final step, a computer analyzes the fringe contrast variation as a function of time and obtains the distance from the fiber endface to the target.

It is another object of the invention to measure distances to an accuracy of 0.001 inch, for a variety of materials including those that are not measurable by electronic means, over a range of 0.1 to 10 inches, without mechanically contacting the surfaces involved. For reasons of eye safety, the optical power should be limited to 100 µW at the measurement probe. It is further an object of this invention that the technology used not be intrinsically expensive to implement.

It is another object of the invention to provide a method and apparatus with the following advantageous characteristics: high accuracy (<1 mil) due to the dual wavelength source, no ambiguity interval, reduced vibration sensitivity compared to conventional interferometers, accommodates moving targets such as rotating shafts and wheels, no component of the preferred embodiment is intrinsically expensive, cooperative targets such as retroreflectors are not required, and works over 10 inch range with narrow (0.1 inch), low power (0.1 mW) beam.

BRIEF DESCRIPTION OF THE DRAWINGS

The features set forth above and other features of the invention are made more apparent in the ensuing Detailed Description of the Invention when read in conjunction with the attached Drawings, wherein.

DETAILED DESCRIPTION OF THE INVENTION

Figure 1:
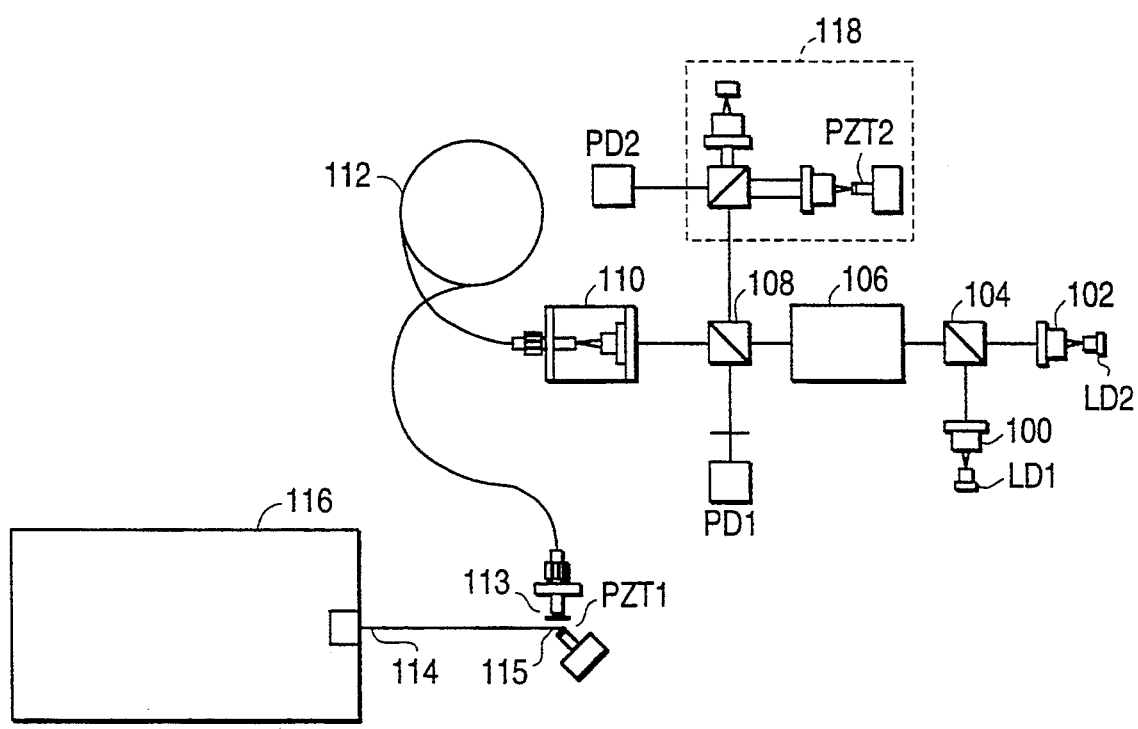
FIG. 1 is a schematic diagram showing a preferred embodiment of the invention.

Referring to FIG. 1, a measurement system constructed and operated in accordance with a preferred embodiment of the present invention is shown. The system is composed of a two-frequency laser source, a reference interferometer and a fiber-coupled target interferometer. It is designed for an operating range of 0.1 to 10 inches (2.5 to 250 mm), with a typical range resolution of 1 mil (25 µm) RMS for unpolished metallic targets.

As shown in FIG.1, the beams from lasers LD1 and LD2 are collimated by optical elements 100, 102, combined by a prism 104 and sent through an isolator 106 to protect them from optical feedback. The combined beam passes through beam combiner 108, which may be a prism, to fiber optic coupler 110 where the beam enters a single-mode fiber 112 and is sent to the target 114 in the form of a 0.01-inch (250 µm) diameter collimated beam. The small beam size is obtained with a 0.18 pitch graded-index (GRIN) lens 113. The fold mirror 115 delivers the combined beam onto target 114. The interference signal is obtained by combining the light scattered from the target surface with the natural 4% Fresnel reflection from the end of an optical fiber. The light returning through the fiber is directed onto the detector PD1 by beam combiner 108.

The unwanted reflection at the source end of the fiber is deflected by cleaving the fiber at an angle. Approximately 100 µW of laser light is directed towards the target. The target detector PD1 receives 0.2 µW of light reflected from the fiber endface and less than 1 nW of the light scattered from the target.

The phase modulation carrier signal for modulating the relative phase of the interference pattern is generated by a piezo-electric transducer (PZT1), which oscillates fold mirror 115 at 1 kHz with an amplitude of 0.05 mils (1.25 µm). This allows the interference signal to pass through two cycles of constructive and destructive interference. Thus, a signal at the detector PD1 is generated with an AC amplitude proportional to fringe visibility.

An additional branch may be provided in the configuration in FIG. 1 for employing a compensating reference interferometer. Laser diodes are extremely sensitive to small variations in temperature (30 GHz/°C. typical) and the thermoelectric coolers in the diode mounts are incapable of maintaining the required temperature stability. The reference Michelson interferometer 118, shown in FIG. 1, is included to monitor the drift in synthetic wavelength over time. The paths of the interferometer are fixed. Beam combiner 108 can serve to supply a portion of the combined beam to the reference interferometer. The interference pattern in the compensating reference interferometer is phase modulated by transducer PZT2, in the same manner as the target interference pattern is phase modulated by PZT1. The resulting interference pattern output by 118 is sensed by reference detector PD2.

The linear translation stage 116 is used to calibrate the system and provides the exact distance for the measured distance to be compared against in evaluating the system. In actual operation, this stage would not be present.

The following theoretical description of signal generation and analysis for CSW laser radar will be useful in understanding this embodiment.

The round-trip optical path length z=2x is defined relative to an arbitrary point of origin in the target beam for which the interferometric phase is zero. This path length z is equal to twice the physical distance to the object times the phase-velocity refractive index of the medium. In an ideal, intensity-balanced interferometer having a two-color source with vacuum emission wavenumbers $k_1 = 2\pi/\lambda_1$ and $k_2 = 2\pi/\lambda_2$ there are two simultaneous interference patterns $$I_1 = j_1(1 + \cos(k_1 z)) \tag{3a}$$

$$I_2 = j_2(1 + \cos(k_2 z)) \tag{3b}$$

These patterns add together by incoherent superposition, resulting in a new pattern $$I = 1 + V(z, \beta) \cdot \cos(\bar{k} z) \tag{4}$$

where $\bar{k}$ is the average wavenumber and the coefficient $$V(Z,\beta) = \cos(\beta Z) \tag{5}$$

is characterized by the synthetic wavenumber $\beta = 2\pi/\Lambda$. The distance Z is twice the physical distance to the target times the group-velocity refractive index. For relative distances measured in air, the difference between Z and z is very small and will be neglected.

A mechanical transducer modulates the distance slightly to generate a signal at the detector with an AC amplitude proportional to the fringe visibility $|V(z,\beta)|$. The synthetic-wavelength chirp is achieved by changing $\beta$ an amount $\gamma$ over a period T. The tuning is done linearly with respect to time t, so that $$\beta(t) = (t/T)\gamma + \beta(0) \tag{6}$$

The phase of the visibility curve can now be expressed as a time-dependent function having a "chirp beat frequency," in cycles per period T, of $$f = z\gamma/2\pi \tag{7}$$

and a synthetic phase offset $$\Phi(0) = z\beta(0) \tag{8}$$

These frequency and phase parameters are extracted from the visibility curve by Fourier Transform analysis, counting fringes as a function of time, or some equivalent method of frequency and phase detection. The phase $\Phi(0)$ represents the synthetic phase for the synthetic wavelength $\Lambda(0)$ corresponding to $\beta(0)$.

As is the case with all two-wavelength interferometers, the synthetic phase offset $\Phi(0)$ has a $2\pi$ ambiguity associated with it. This difficulty is made explicit by $$\Phi(0) = \tilde{\Phi} + 2\pi m_0 \tag{9}$$

where $0 < \tilde{\Phi} < 2\pi$ is the relative phase obtained directly from the fringe-visibility data, and $m_0$ is an integer expressing the $2\pi$ phase ambiguity. This problem is solved in chirped synthetic wavelength interferometry by making use of frequency f. Solving Eq.(7) for z and substituting the result into Eq.(8), we obtain the estimate $$\Phi'(0) = (2\pi f/\gamma)\beta(0) \tag{10}$$

of the synthetic phase. Remembering that $m_0$ is by definition an integer $$m_0 = Int\{1/2\pi(\Phi'(0) - \tilde{\Phi})\} \tag{11}$$

where the function Int{} is equal to the nearest integer to its argument. The phase $\Phi(0)$ no longer has a $2\pi$ ambiguity and can be used to calculate the absolute optical path difference:

$$z = \Lambda(0)\Phi(0)/2\pi \tag{12}$$

The ability to determine the synthetic phase without ambiguity, using a two-wavelength source with limited tuning bandwidth, is a significant advantage of the invention.

Continuous calibration may be provided by a separate compensating reference interferometer having a fixed optical path difference $z_{ref}$. The corresponding phase $\Phi(0)_{ref}$ is used in an inverted form of Eq.(12):

$$\Lambda(0) = 2\pi z_{ref}/\Phi(0)_{ref} \tag{13}$$

This calculation assumes that $\Phi(0)_{ref}$ does not vary by more than $\pm\pi$ from some initial estimate that is made when the instrument is first turned on. A similar calculation for the synthetic wavenumber chirp excursion $\gamma$ for use in Eq.(10) can also be made from a value $f_{ref}$ for the chirp beat frequency in the reference interferometer and an inverted form of Eq.(7):

$$\gamma = 2\pi f_{ref}/z_{ref} \tag{14}$$

These calibrations make the measurement independent of the frequency drifts that are characteristic of laser diode sources.

Figure 2:
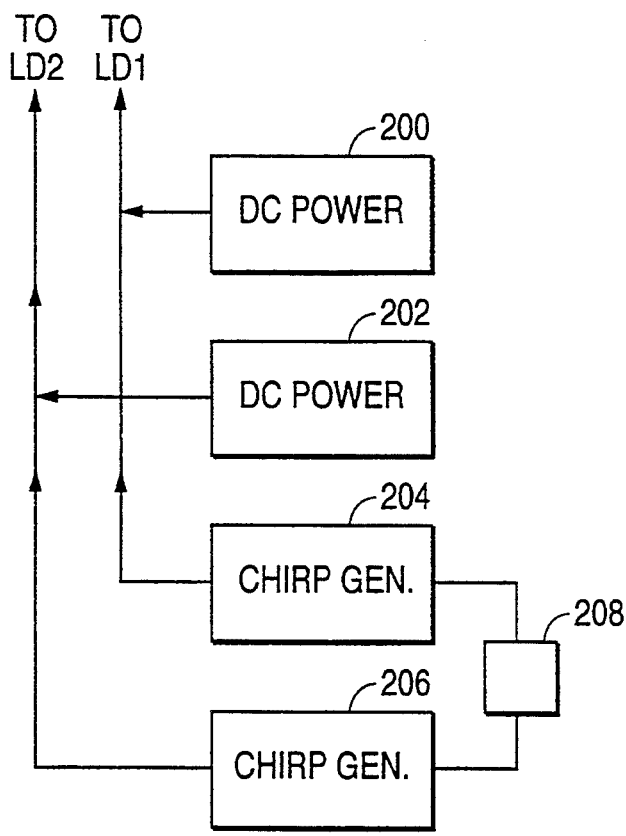
FIG. 2 is a block diagram of the electronics used in to drive the laser diodes in the preferred embodiment of the invention.

The two-color source in FIG. 1 may be, for example, a pair of Sharp LTO80 wavelength-stabilized laser diodes, operating at 26° C. and DC biased at 45 mA for an average power output of 2.5 ms. The average wavelength is 780 nm and the frequency separation at $t=0$ is approximately 190 GHz, corresponding to an equivalent or synthetic wavelength of 60 mils (1.5 mm). A chirp bandwidth of 32 GHz is obtained by simultaneously current tuning both lasers over a period $T=190$ ms in opposite directions. Trigger 208 ensures the simultaneous operation of the chirp generators 204, 206. A 3 mA current modulation, supplied by the chirp generators 204, 206, is superimposed on the DC bias, supplied by the DC power sources 200, 202, as shown in FIG. 2. The current modulation introduces a 2 ms variation in power output of each of the diodes; however, the power variations are complementary, so that the total power output is constant. The coherence length of the source is approximately 30 inches (about 1 meter). Noise that would otherwise be generated by interference of the return signal with accidental reflections in the apparatus is suppressed by using an optical fiber 112 that is long (>1 meter) compared to the coherence length of the lasers.

Figure 3:
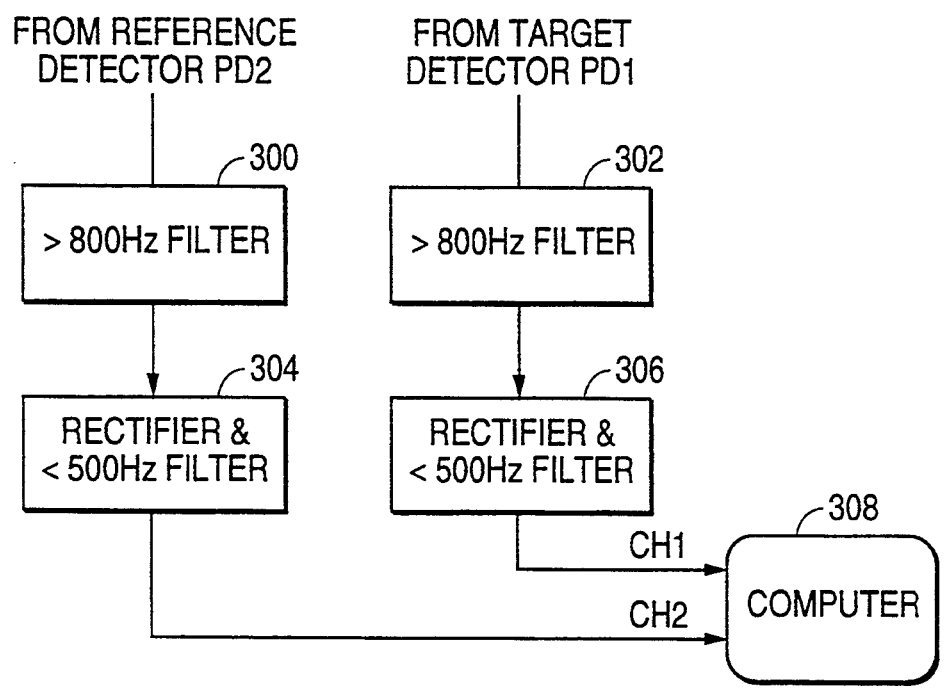
FIG. 3 is a block diagram of the electronics used to analyze the interference patterns in the preferred embodiment of the invention.
Figure 4:
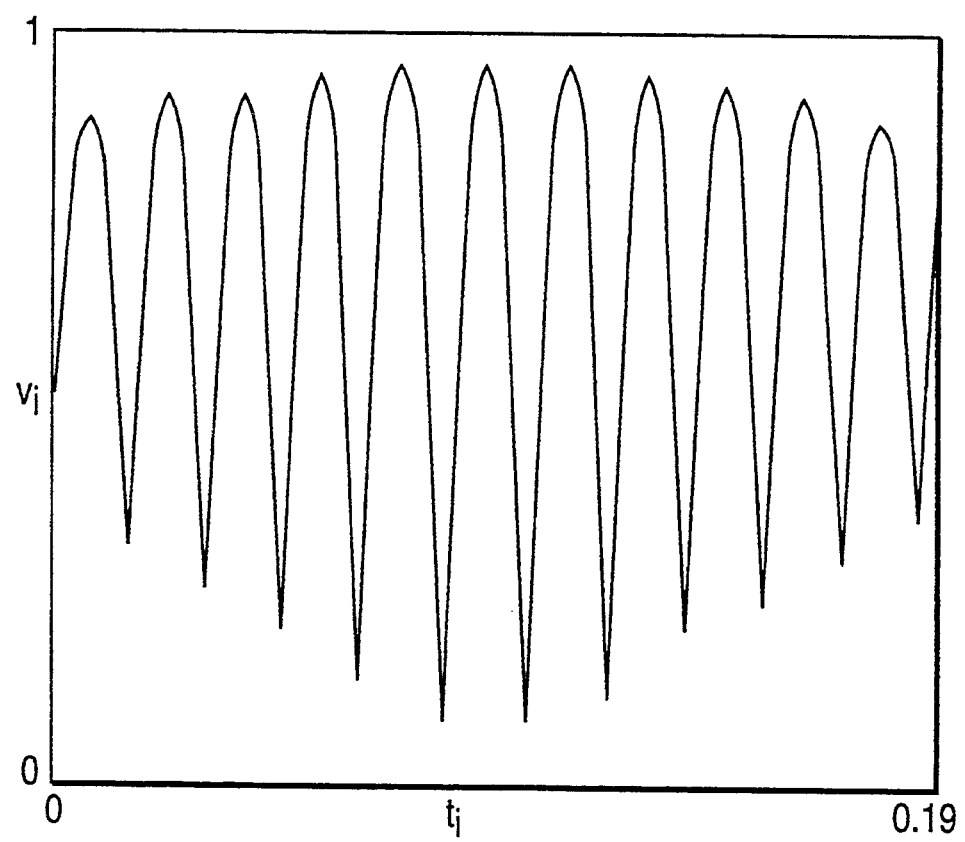
FIG. 4 is a graph depicting the theoretical fringe contrast x=2,098 inch (53.29 mm)
Figure 5:
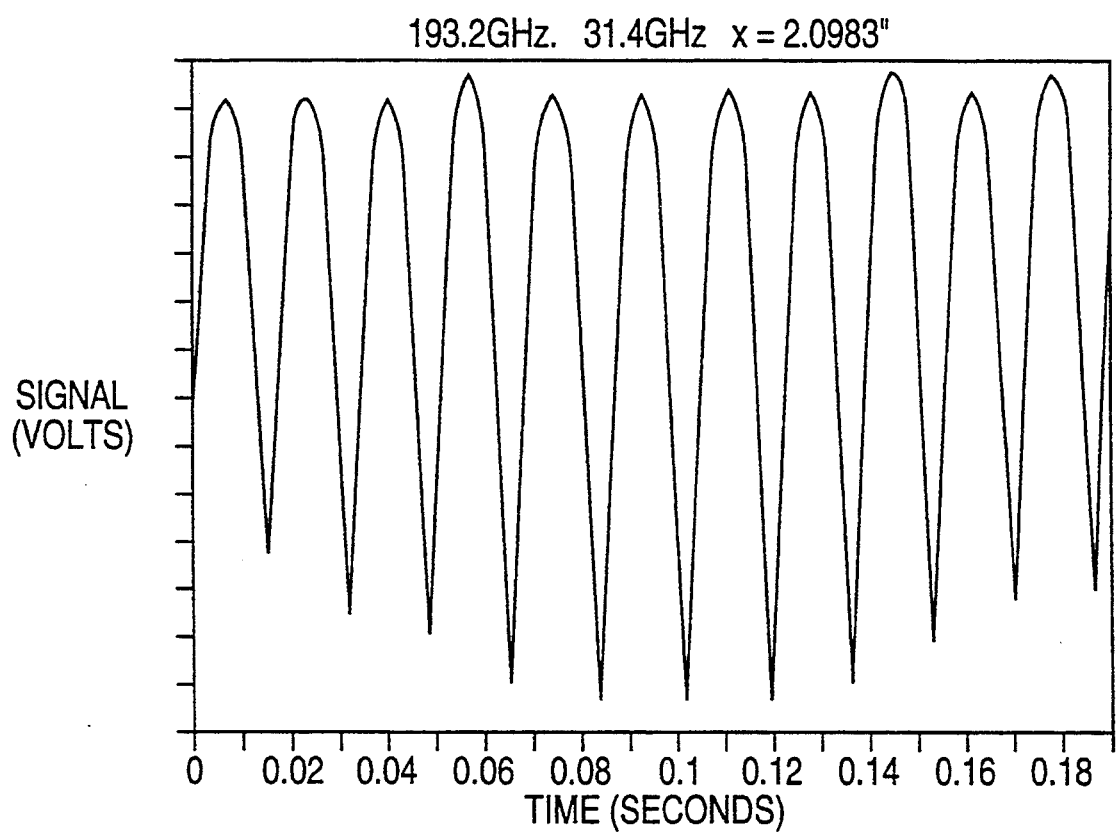
FIG. 5 is a graph depicting the experimental fringe contrast, same parameters as FIG. 4.

Referring to the block diagram in FIG. 3, the interferometric signal received by PD1 is transmitted through high-pass filter 302 with a cutoff frequency of 800 Hz, then rectified and transmitted through low-pass filter 306 with a cutoff frequency of 500 Hz to yield the fringe-contrast curve. Although the interferometer used for the target signal is in principle a multiple-beam Fabry-Perot interferometer, its finesse is so low that the two-beam analysis for the fringe contrast function may still be used. This is shown in FIG. 4 and FIG. 5, where the theoretical and experimental visibility curves are compared for a distance x of 2.10 inches (51.3 mm). The effect of the varying relative power output of the diodes manifests itself as a change in modulation depth of the visibility curve as a function of time, as is evident from the figures. To the first order, this relative power variation does not effect the phase or frequency of the modulation.

The system is controlled by a computer 308, shown in FIG. 3, that simultaneously acquires 2048 points of fringe-contrast data for both the target and reference interferometers during the $T=190$ ms chirp period. The values for $\Phi(0)$ and f in the experimental apparatus are obtained from the fringe contrast data by a least-squares linear fit to a plot having as an ordinate, the phase $\Phi$ in units of $2\pi$, and as an abscissa, the positions of the minima in the fringe contrast curve in units of time t normalized to the chirp period T. Alternative signal processing means rely on the well-known Digital Fourier Transform algorithm to extract phase and frequency. The system is simultaneously calibrated using the reference length $z_{ref}$, Eqs. (13),(14) and the corresponding phase and frequency information $\Phi(0)_{ref}$, $f_{ref}$. Eqs.(10) through (12) are then used to calculate the target distance z.

Figure 6:
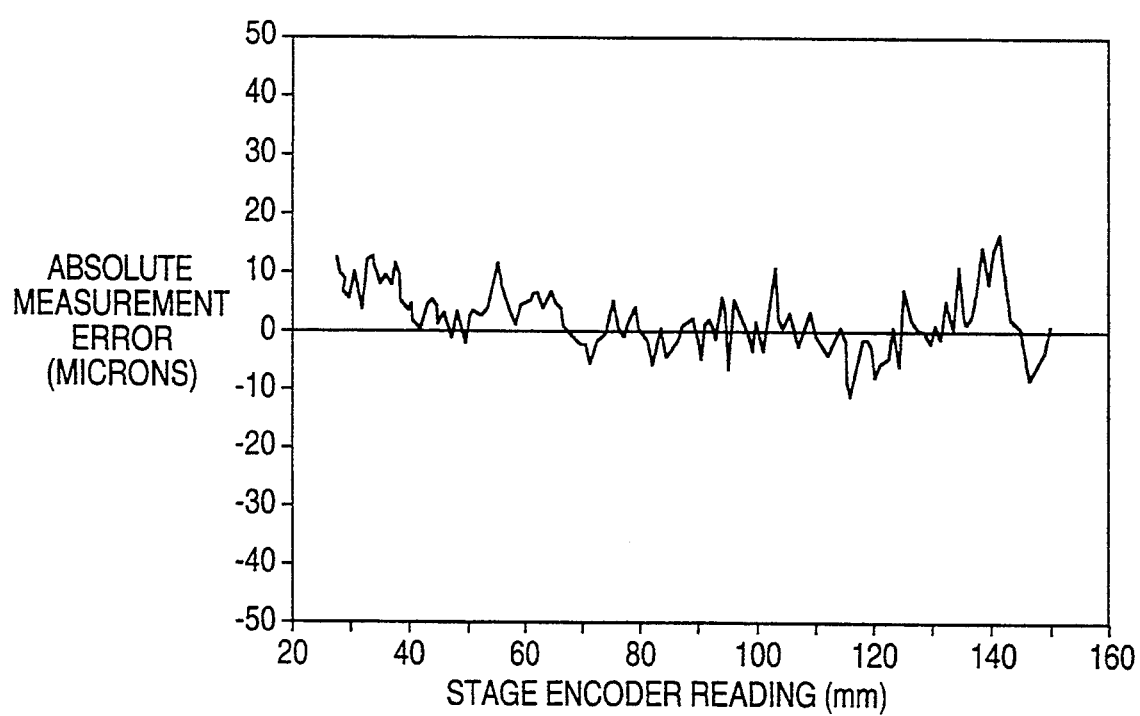
FIG. 6 is a graph depicting the absolute ranging error as a function of the position of a motorized stage equipped with an optical encoder.
Figure 7:
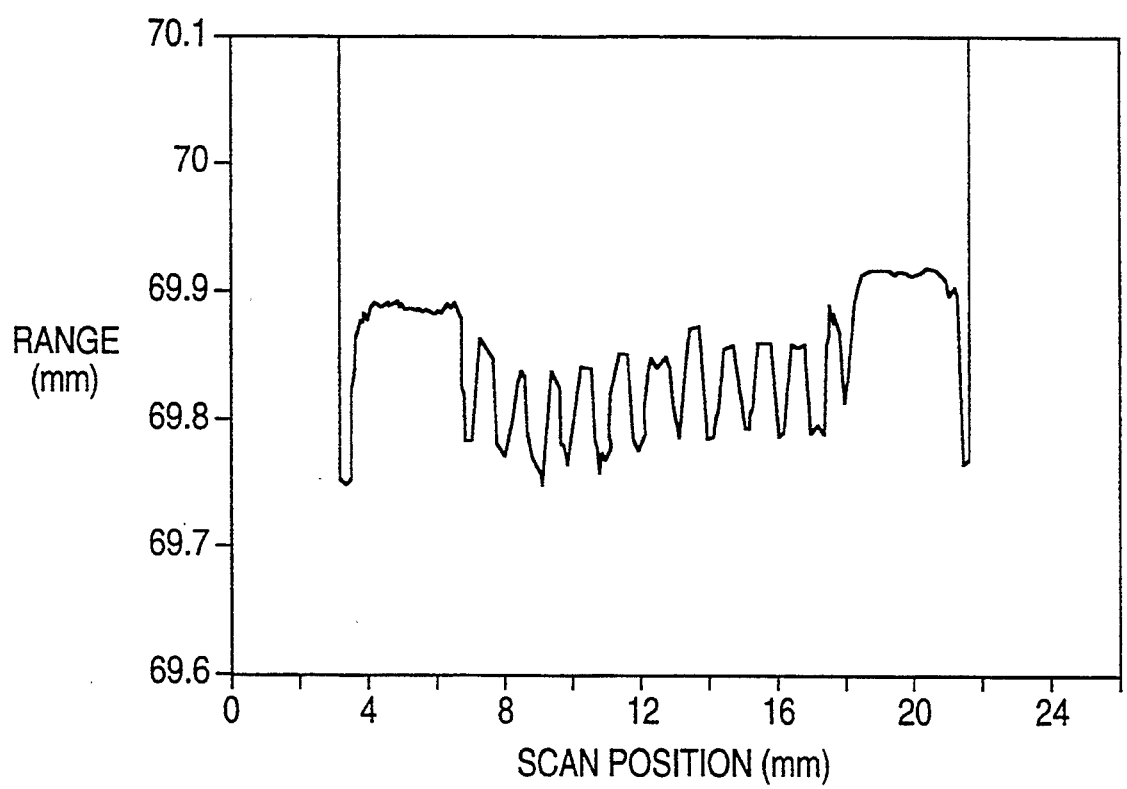
FIG. 7 is a graph depicting the measured profile of the Lincoln memorial relief found on the back of a penny.

The accuracy of the instrument can be determined by comparing CSW range measurements to the optical encoder readings on a precision translation stage. The results in FIG. 6 for a data acquisition rate of 5 Hz show an RMS absolute error of 5 $\mu$m over a 150 mm displacement. It is also possible to profile objects with non-specular surfaces. The curve in FIG.7 is a scan of the Lincoln memorial that appears on the back side of a penny, obtained at a distance of 2.5 inches from the probe. It is noteworthy that this profile is obtained without focusing the probe beam. Like all optical heterodyne laser radars, the present system has the advantage of high sensitivity with low light levels and common detectors. However, since the CSW laser radar is a coherent detection device, the signal strength depends greatly on the particular characteristics of the target surface and the resultant speckle pattern produced when the surface is illuminated by spatially coherent light.

Although the present invention has been described in the context of a specific type of distance measurement to a linear translation stage, it should be realized that obvious modifications of the probe design would permit other types of measurement such as gaps, hole diameters, depths, thicknesses and profiles. Further, although the Detailed Description of the Invention was in the context of a preferred embodiment it will be appreciated by those having skill in the art that changes and modifications may be made thereto without departing from the scope and spirit of the invention. Thus it should be realized that different phase detection and signal processing means, other laser wavelengths, and more or fewer than the number of optical components shown in FIG. 1 may be employed, while yet obtaining the same result.

Other designs within the spirit and scope of the inventions will be apparent to those skilled in the field after receiving the above teachings. The invention, therefore, is defined with reference to the following claims.

What is claimed is:

1. An apparatus for generating continuous fringe contrast data comprising:
    two lasers, wherein wavelengths of laser beams generated by said lasers are each separated from a central wavelength in an equal magnitude, but in opposite directions, whereby one of said wavelengths is larger and the other of said wavelengths is smaller than said central wavelength;
    a beam combining device receiving said laser beams and outputting a combined beam;
    means for directing said combined beam onto a target, wherein light scattered from said target interferes with a portion of said combined beam to form an interference beam;
    means for modulating the phase of said interference beam;
    means for linearly tuning both lasers in opposite directions around said central frequency over a tuning period; and
    a detection means for receiving said modulated interference beam and for outputting an interference signal proportional to fringe contrast over an acquisition period corresponding to the tuning period.

2. An apparatus as recited in claim 1, wherein said directing means comprises:
    an optical fiber receiving said combined beam from said beam combining device and outputting said combined beam at some point away from said beam combining device; and
    a GRIN lens receiving said combined beam from said optical fiber and outputting a combined beam having a reduced size.

3. An apparatus for measuring distances comprising:
    two lasers each outputting a laser beam, wherein said laser beams have a relative frequency separation;
    a beam combining device receiving said laser beams and outputting a combined beam;
    means for delivering said combined beam to a target, wherein light scattered from said target interferes with a portion of said combined beam to form an interference beam;
    a detector means for receiving said interference beam and outputting an interference signal;
    means for tuning said lasers in opposite directions over a tuning period; and
    processing means for receiving a plurality of said interference signals over an acquisition period corresponding to the tuning period and for outputting a distance between a target end of said delivery means and said target.

4. An apparatus as recited in claim 3, further comprising means for phase modulating said interference beam.

5. An apparatus as recited in claim 4, wherein wavelengths of laser beams generated by said lasers are each separated from a central wavelength in equal magnitude, but in opposite directions and said lasers are tuned linearly in opposite directions around said central wavelengths, one of said wavelengths being smaller and one larger than said central wavelength.

6. An apparatus as recited in claim 3, wherein said tuning means further comprises:
    a DC power source for each of said lasers; and
    a chirp generator for each of said lasers, wherein a power variation introduced by said chirp generators is complementary to each other such that said combined beam has a constant power.

7. An apparatus as recited in claim 3, further comprising:
    means for splitting off a portion of said combined beam;
    a compensating reference interferometer receiving said split off portion; and
    a detector receiving a reference interference pattern from said compensating reference interferometer and outputting a reference interference signal, wherein said processing means receives said reference interference signal.

8. An apparatus as recited in claim 3, wherein said delivering means comprises an optical fiber.

9. A method for measuring a distance to a target, comprising the steps of:
    generating two laser beams at different wavelengths, wherein said wavelengths are each separated from a central wavelength in an equal magnitude, but in opposite directions, one of said wavelengths being smaller and one larger than said central wavelength;
    combining said laser beam to form a combined beam;

splitting said combined beam into a reference beam and a target beam;

delivering said target beam to said target;

producing a target interference pattern between said target beam scattered by said target and a portion of said target beam;

detecting said target interference pattern;

producing a reference interference pattern from a reference interferometer using said reference beam;

detecting said reference interference pattern;

continuously tuning both laser beams in opposite directions around said central wavelength over a tuning period;

acquiring both interference patterns over an acquisition period corresponding to the tuning period; and processing said target interference patterns and said reference interference patterns to determine the distance from a predetermined point to said target.

10. A method as recited in claim 9, wherein said processing step further comprises:

determining a value of a relative synthetic phase $\Phi$ and chirp beat frequency f from said target interference pattern;

determining a value of a relative synthetic phase $\Phi_{ref}$ and chirp beat frequency $f_{ref}$ from said reference interferometer;

determining a drift-corrected value for the synthetic wavelength $\Lambda(0)$ and chirp range $\gamma$ from the values for $\Phi_{ref}$ and $f_{ref}$ corresponding to said reference interferometer, assuming some approximate initial value for the synthetic wavelength;

determining a true synthetic phase $\Phi(0)$ for said target that is free of $2\pi$ phase ambiguities, by using the chirp beat frequency f to determine the integral number of $2\pi$ cycles that should be added to the relative synthetic phase $\Phi(0)$; and calculating said distance based on the true synthetic phase $\Phi(0)$ and the synthetic wavelength $\Lambda(0)$.

11. A method for measuring a distance to a target comprising the steps of:

combining two laser beams having a relative frequency separation;

delivering said combined beams through an optical fiber to said target;

mixing light scattered from said target and light reflected from a target end of said fiber, resulting in an interference pattern having a fringe contrast;

returning said mixed light through said fiber;

directing said mixed light onto a detector;

outputting an interference signal from said detector, resulting in a voltage proportional to said fringe contrast;

linearly varying said frequency separation of said lasers;

acquiring said voltage over an acquisition period;

analyzing said fringe contrast as a function of time; and deriving from said analysis, the distance from said target end of said fiber to said target.

12. A method as recited in claim 11, further comprising the steps of:

rectifying said interference signal; and filtering said interference signal.

* * * * *